United States Patent [19]

Krantz et al.

[11] Patent Number: 5,345,353
[45] Date of Patent: Sep. 6, 1994

[54] STEP PROJECTION AIR BEARING SLIDER WITH IMPROVED STICTION PERFORMANCE AND WEAR RESISTANCE

[75] Inventors: Matthias C. Krantz, San Jose; Vlad J. Novotny, Cupertino; Timothy C. O'Sullivan, San Jose; Andrew C. Tam, Saratoga, all of Calif.

[73] Assignee: International Business Machines Corporation, Armonk, N.Y.

[21] Appl. No.: 948,182

[22] Filed: Sep. 21, 1992

[51] Int. Cl.$^5$ .............................................. G11B 5/60
[52] U.S. Cl. .................................................. 360/103
[58] Field of Search ........................................ 360/103

[56] References Cited

U.S. PATENT DOCUMENTS

| | | |
|---|---|---|
| 3,197,751 | 7/1965 | Felts . |
| 3,573,768 | 4/1971 | Harris ............................. 340/174.1 |
| 3,855,625 | 12/1974 | Garnier et al. ...................... 360/103 |
| 4,218,715 | 8/1980 | Garnier ............................. 360/103 |
| 4,420,780 | 12/1983 | Deckert ............................ 360/103 |
| 4,475,135 | 10/1984 | Warner et al. ..................... 360/103 |
| 4,549,238 | 10/1984 | Ertingshausen .................... 360/103 |
| 4,636,894 | 1/1987 | Mo .................................. 360/103 |
| 4,660,114 | 3/1987 | Yamakawa et al. ................. 360/122 |
| 4,802,042 | 1/1989 | Strom ............................... 360/103 |
| 4,814,906 | 3/1989 | Suzuki et al. ...................... 360/75 |
| 4,870,519 | 9/1989 | White ............................... 360/103 |
| 4,894,740 | 1/1990 | Chhabra et al. .................... 360/103 |
| 4,901,185 | 2/1990 | Kubo et al. ....................... 360/104 |
| 4,984,114 | 1/1991 | Takeuchi .......................... 360/103 |
| 5,067,037 | 11/1991 | Ananth ............................. 360/103 |

OTHER PUBLICATIONS

T. O'Sullivan et al., "Sliders with Well-Defined Undulation Patterns on the ABS for Improved Stiction and Flyability", IBM Technical Disclosure Bulletin, vol. 34, No. 4B, Sep. 1991, pp. 158-160.

*Primary Examiner*—A. J. Heinz
*Attorney, Agent, or Firm*—Baker, Maxham, Jester & Meador

[57] ABSTRACT

Slider disk stiction is reduced in a disk-based storage device by providing one or more step projections on the air bearing surface of a slider. The rear part of the step projections which rest on the disk surface projections are forward of the slider pivot point. When the slider rests on a disk surface, the step projections elevate the leading edge of the slider, which imposes a static pitch angle on the slider, reducing the slider/disk contact area. Provision is also made for contouring the slider air bearing surface adjacent to the slider leading edge, using a taper or the step projection leading face, to compress the airflow and provide a stable slider air bearing during disk file operation.

6 Claims, 12 Drawing Sheets

| STEP HEIGHT (nm) | STEP FH (nm) | MIN FH (nm) | PITCH ANGLE (μ rad) |
|---|---|---|---|
| 300 | 295 | 123 | 230 |
| 400 | 309 | 125 | 285 |
| 500 | 305 | 126 | 331 |

STEP PROJECTION AIR BEARING SLIDER WITH IMPROVED STICTION PERFORMANCE AND WEAR RESISTANCE

BACKGROUND OF THE INVENTION

The invention relates generally to direct access storage devices (DASD), and more specifically to air bearing slider structures employed in the head disk assembly (HDA) of a DASD. More particularly, the invention relates to a slider structure which reduces stiction between the air bearing surface of a slider and the surface coating of a rigid disk. Typically, the surface of a rigid disk has applied to it a thin layer of liquid lubricant which serves to reduce friction and potential disk wear when the air bearing surface of a slider contacts the disk surface, as during take-off and landing of the slider.

When a slider is at rest on the surface of a disk, a static frictional force (stiction) between the air bearing surface of a slider and the disk arises from adhesion and from capillary forces exerted primarily by the liquid lubricant. Stiction depends upon the slider/disk contact area, the contact pressure and the thickness of the liquid lubricant layer; it can entirely stall a low torque drive upon startup or cause damage to the disk or slider.

A number of techniques have been proposed for reduction of stiction. For example, some DASD's have been provided with expensive slider load/unload mechanisms. For thin film disks, various means of texturing and patterning the disk surface or slider surface have been proposed and used. While these latter techniques reduce the contact area, they can accelerate disk wear and corrosion and degrade the magnetic signal-to-noise performance of the disk. Large amounts of roughness or texturing can adversely affect slider flying dynamics. Thus, there is an inherent tradeoff between reliability and stiction reduction.

Current slider air bearing designs have been optimized to enhance slider flying dynamics during operation. These designs are variations of a flat air bearing surface (ABS) and generally include a tapered transition between the leading edge of the slider and the flat part of the air bearing surface. The advantage of the transition is that it compresses the air flow under the remaining flat part of the slider's ABS, thereby enhancing the stability and take-off characteristics of the slider during flight. However, these current designs still employ a relatively large flat ABS area and, therefore, do not alleviate the stiction problem.

Accordingly, there is a manifest need for a slider design which reduces stiction. Preferably, such a design would reduce stiction by reducing the slider/disk contact area without reducing device reliability or performance.

SUMMARY OF THE INVENTION

The invention is based upon the inventors' critical realization that slider/disk contact area can be reduced by providing a step projection on the slider ABS to impose a static pitch angle between the air bearing surface of the slider and the disk surface when the slider rests on the disk surface.

The height of the step projection is selected to be sufficiently large to give adequate stiction reduction, yet not so large that the clearance between it and the disk surface is less than the minimum flying height at the trailing end of the slider at operating disk velocities.

The primary embodiment of this invention includes a conventional taper adjacent to the slider leading edge which compresses the bearing fluid at operational velocities, and a step projection on the ABS and tapered region adjacent to the leading edge portion of the slider ahead of the pivot position. A second embodiment accomplishes airflow compression by using the front portion of the step projection, which is set-back from the slider leading edge.

It is, therefore, the principal objective of this invention to provide a slider design which reduces stiction.

The principal objective is achieved by provision of a step projection on a slider that imposes a static pitch angle between the slider's bearing surface and a disk surface when the slider is at rest, but which does not degrade the reliability or the performance of the slider during operation.

The achievement of these objectives and other important advantages by the invention will be appreciated when the following detailed description is read with reference to the below-described drawings.

DETAILED DESCRIPTION OF THE PREFERRED EMBODIMENTS

THE INDUSTRIAL ENVIRONMENT

Figure 1:
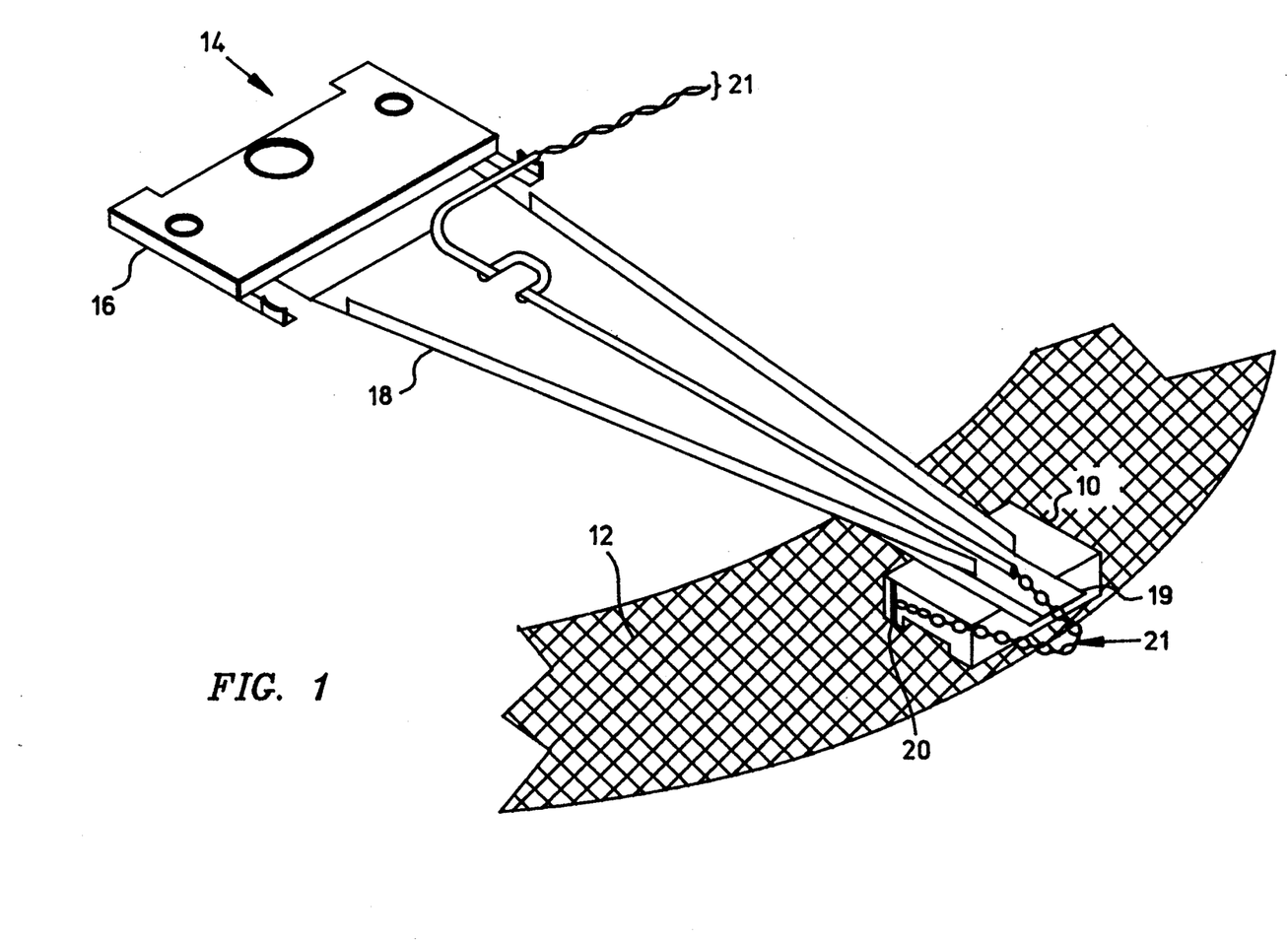
FIG. 1 is a perspective view illustrating means for employing the invention in an industrial environment.

FIG. 1 is perspective view illustrating means for employing the present invention in a direct access storage device (DASD). In this regard, the invention concerns a slider 10 which is supported in a DASD with respect to a disk surface 12 by a slider suspension assembly 14 which includes a mount plate 16 and load beam 18. The slider 10 is attached to the load beam 18 by means of a flexure 19. A data read/write transducer 20 is mounted on the slider 10. One or more leads 21 connect the transducer 20 to DASD electronics.

Figure 2:
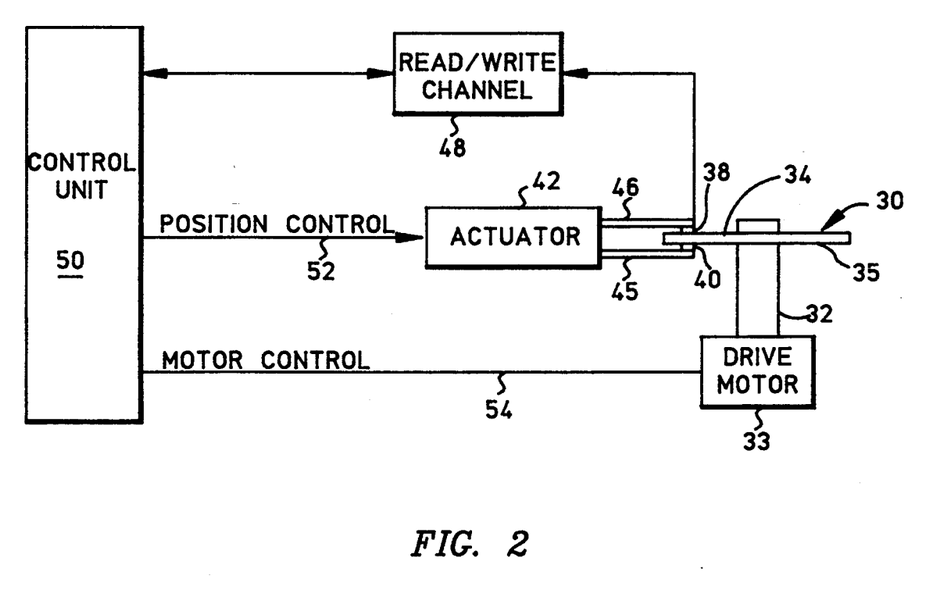
FIG. 2 is a block diagram illustrating the essential complement of functions for operation of the invention in the industrial environment of FIG. 1.

FIG. 2 is a block diagram illustrating the essential complement of functional components in a DASD employing the slider design of this invention. Although FIG. 2 illustrates a single-disk device, it is to be understood that this is not intended to limit the practice of the invention to such devices. In fact, the invention is applicable as well to DASD's with multiple disks.

In FIG. 2, the disk 30 is mounted on a rotatable spindle 32 that is rotated by a drive motor 33. The disk 30 has an upper surface 34 and a lower surface 35. A slider 38 with a transducer mounted thereon faces the upper surface 34. Another slider 40 with a transducer mounted thereon faces the lower surface 35. The sliders 38 and 40 are positioned with respect to these surfaces 34 and 35 by respective moveable slider arm assemblies 45 and 46. The arm assemblies are conventionally mounted to an actuator 42. The transducers on the sliders 38 and 40 are connected to conventional data channel electronics. In FIG. 2, read/write channel electronics 48 are shown only for the slider 38, it being understood that the transducer on the slider 40 is similarly supported in the DASD. A control unit 50, typically in the form of a processor, provides position control signals on a signal path 52 to the actuator 42. These signals control the positions of the sliders 38 and 40 with respect to the surfaces of the disk 30. The control unit 50 provides motor speed control signals to control the rotational speed of the drive motor 33. The control unit 50 also processes read and write signals for the transducer on the slider 38 by way of the read/write channel electronics 48.

Each slider 38 and 40 may support one or more read/write transducers. As the disk 30 rotates, the sliders 38 and 40 are moved radially in and out over their respective disk surfaces so that the read/write transducers may access different portions of the disk 30 where desired data is recorded. Each slider 38 and 40 is attached to its respective actuator arm 45 and 46 by means of a suspension mechanism. The suspension mechanism provides a slight spring force which biases the slider toward a disk surface.

During operation of the DASD, rotation of the disk 30 generates a cushion of air (an "air bearing") between each of the sliders 38 and 40 and its respective disk surface. The air bearing exerts an upward force against a slider, which counterbalances the slight spring force exerted on the slider by the suspension mechanism. The balance of forces between the air bearing and the suspension supports a slider off of a disk by small, substantially constant spacing ("flying height") during operation.

The flying height of a slider is the distance between a particular point on a slider and the disk surface when the slider is supported on its cushion of air. Typically, the slider point coincides with a transducer location; usually, this location is at the trailing edge of the slider. Hereinafter, flying height will be discussed with respect to both a step projection on a slider and the slider trailing edge. It should also be noted that the terms "spacing" and "slider spacing" when used in the description and drawings are synonymous with flying height.

THE INVENTION

Figures 3, 4:
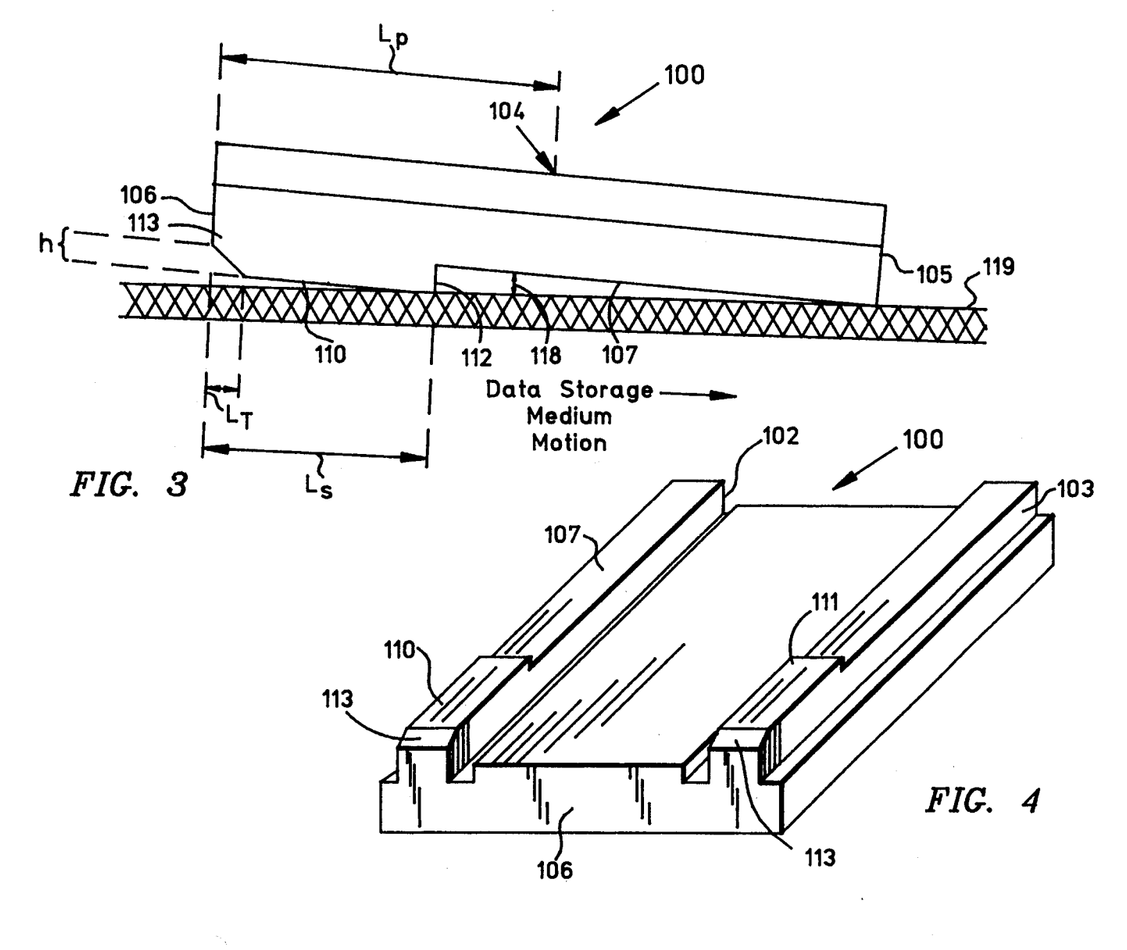
FIG. 3 is a side elevational sectional view of a slider assembly with a taper step projection according to the present invention.
FIG. 4 is a perspective view of the bottom of the slider assembly of FIG. 3.

FIGS. 3 and 4 illustrate a slider assembly 100 constructed in accordance with one embodiment of the present invention. The slider assembly 100 has a dual rail configuration and includes a pair of rails 102 and 103 which are spaced apart on the bottom surface of the slider and which extend longitudinally between a trailing edge 105 and a leading edge 106 of the slider assembly. The top of the slider is attached to a suspension mechanism (not shown) via a flexure which contains a pivot point 104 about which the slider can rotate.

Each rail has the well-known "taper-flat" configuration in which the transition between the leading edge 106 of the slider and the flat part of the air bearing surface of the rail is slanted. The slant is referred to as a "taper". As is known, when a disk moves under the air bearing surface of a taper-flat rail, the air pressure increases from the leading edge to the point where the taper transitions to the flat portion of the air bearing surface. Following the transition, the pressure against the air bearing surface decreases in the direction of the trailing edge until, just forward of the trailing edge, the pressure increases once again. The taper-flat configuration is preferred since it affords a great deal of stability to the slider during operation.

In the prior art, when a dual-rail slider is at rest against the surface of a disk, the slider/disk contact area extends along the entire flat part of the air bearing surface of the rails. This, of course, increases the stiction force between the slider and the disk surface. FIGS. 3 and 4 illustrate how the invention reduces the total slider/disk contact area for the illustrated dual-rail slider. The invention consists of a step projection (or "protuberance" or "spacer") in the forward portion of at least one of the air bearing surface rails. These projections are indicated by reference numerals 110 and 111. As FIG. 3 illustrates, the projection 110 is located forward of the pivot point 104 and exhibits a step-wise transition at its rear edge 112 to the rear part of the air bearing surface 107, and includes the front tapered transition 113 to the leading edge 106 of the slider. The step projections are dimensioned and located such as to impose an angle 118 between the slider air bearing surface and the surface of a disk 119 on which the slider assembly 100 rests when not in operation. Although not shown in FIG. 3, it is asserted that a very thin topical layer of a lubricant may also be applied to the disk surface.

The dimensions and relative locations of the step projections 110 and 111 are identical and will be explained with reference to the projection 110 shown in the elevation view of FIG. 3. The step projection 110 has a height (h) which is measured with respect to the air bearing surface 107. In addition, there are three lengths, LS, LT, and LP. Relatedly, the step length LS is the length of the step projection 112 between the leading edge 106 and the step transition to the rear part of the fluid bearing surface 107. The taper length LT is the length of a linear projection of the taper 112 which is parallel to a projection of LS. The pivot length LP is simply the distance between the leading edge and a line or locus through the pivot point 104.

In the embodiment of the invention illustrated in FIGS. 3 and 4, the step length LS is such that:

LT<LS<LP.

This enables the slider to rest on the surface of the disk 119 at the angle 118. Since the angle 118 is measured in the same manner as the pitch angle when the slider 100 is flying, this angle, while the slider is at rest, is referred to as the "static pitch angle". The step height h is chosen sufficiently large to open the static pitch angle to a size which will adequately suppress stiction between the slider 110 and the surface of the disk 119 by reducing the total slider/disk contact area. In practice, to satisfy slider-disk interface reliability concerns, the maximum value for the step height h is limited by the requirement that the slider spacing measured between the forward outside corners of the step projections 110 and 111 and the disk surface during operation should be larger (or at least not significantly less) than the minimum flying height measured between the trailing edge 105 and the disk surface at operating disk velocities.

In operation, the single non-planar shaped air bearing surface on each slider rail of the dual-rail configuration illustrated in FIG. 4 will result in different flying heights of the front and rear sections. Further, the air bearing surface design of the invention embodiment illustrated in FIG. 4 results in a continuous front/back pressure distribution.

The step projection illustrated in FIGS. 3 and 4 (referred to hereinafter as the "taper step projection") can be realized during the production of a standard taper-flat air bearing slider by depositing a thin layer of wear-resistant material on the leading edge region of the slider air bearing surfaces. This introduces a small step on the air bearing surfaces. Production control is sufficient to locate the deposition according to the length constraints described above. For a typical dual rail taper-flat air bearing slider pivoted near its center, deposition of small step projections having heights of approximately 0.01 to 1.5 micrometers will result in a static pitch while the slider is at rest on the surface of a disk.

The effects of incorporating step projections on a dual- rail slider according to the embodiment illustrated in FIGS. 3 and 4 were studied using a prior art straight, dual-rail, taper flat slider, which is hereinafter termed the "taper-flat" assembly. The taper-flat assembly was typical of a dual rail slider, but lacked a step projection. The taper-flat assembly used to prepare the graph of FIG. 5 had a slider length of 4 millimeters and width 3 millimeters, a suspension load of 0.10 Newtons, a rail-width of 320 micrometers, a taper length of 390 micrometers, and, at a disk velocity of 30 meters per second, exhibited a flying height of 0.2 micrometers, measured at the trailing edge.

A slider assembly modified to conform to the invention embodiment illustrated in FIGS. 3 and 4 incorporated taper step projections on the air bearing surface as described above. Each step projection had a height h of 0.2 micrometers and a step length LS of 0.8 millimeters. This slider assembly is referred to as the "step-slider" assembly. The step-slider assembly flew at a height of 0.18 micrometers (measured at the slider trailing edge) and exhibited an increased pitch angle as compared to the control assembly. Increasing the rail width of the step-slider assembly to 335 micrometers provided a flying height of 0.2 micrometers at 30 meters/sec, similar to the prior art, reference slider.

Figure 5:
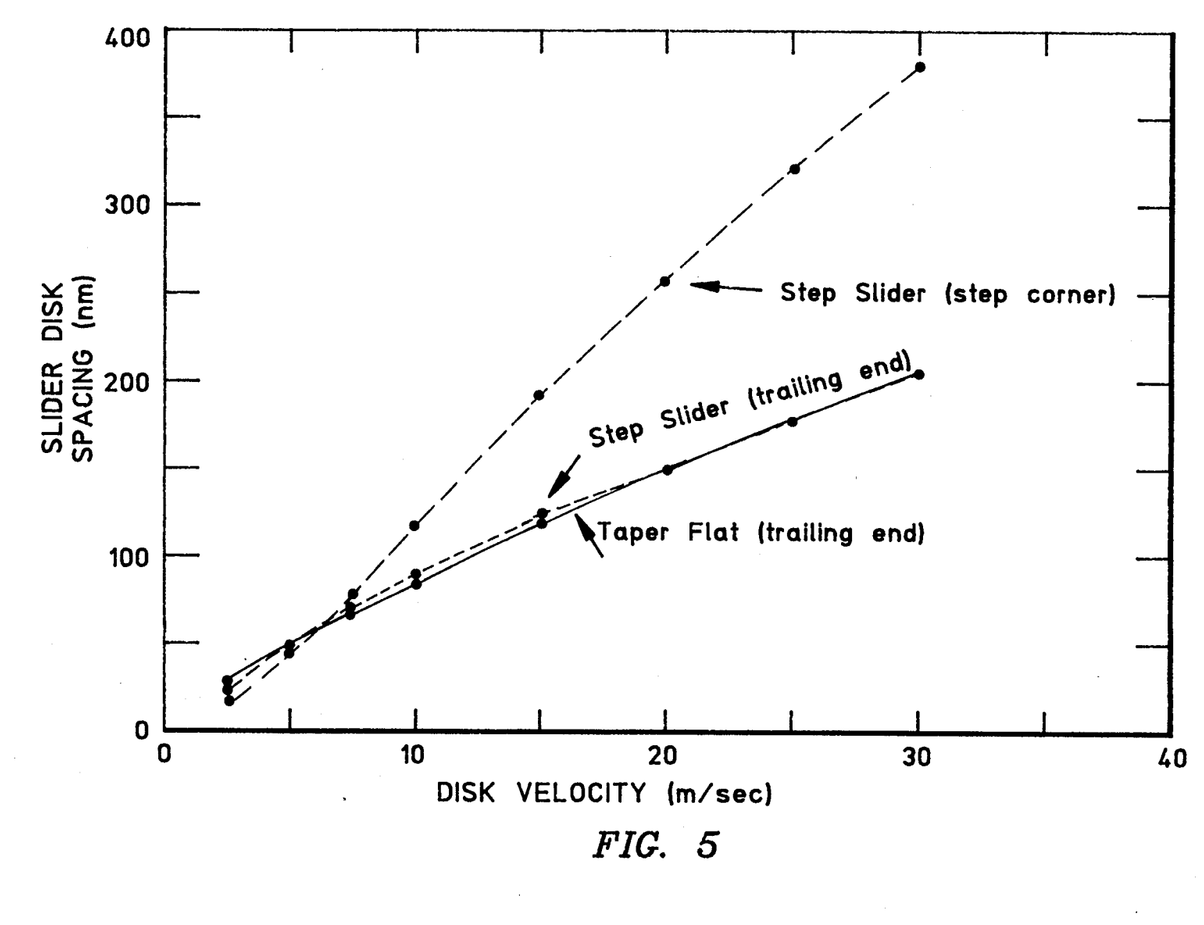
FIG. 5 is a graph illustrating the relationship between flying height ("spacing") and disk velocity for the slider assembly of FIGS. 3 and 4.

FIG. 5 shows graphically the relationship between slider/disk spacing and disk velocity for the two assemblies discussed above. Note that the trailing edge flying heights for the assemblies are very close. The flying height of the step projections in the step-slider assembly are somewhat lower than the assembly's trailing edge flying height at relatively low velocities. However, the flying height of the step projections increases rapidly and, beyond six meters per second, is higher than the trailing edge flying height. Further, widening the ABS rails near the slider leading edge will give a higher flying height for the step projection at lower disk velocities.

Figure 6:
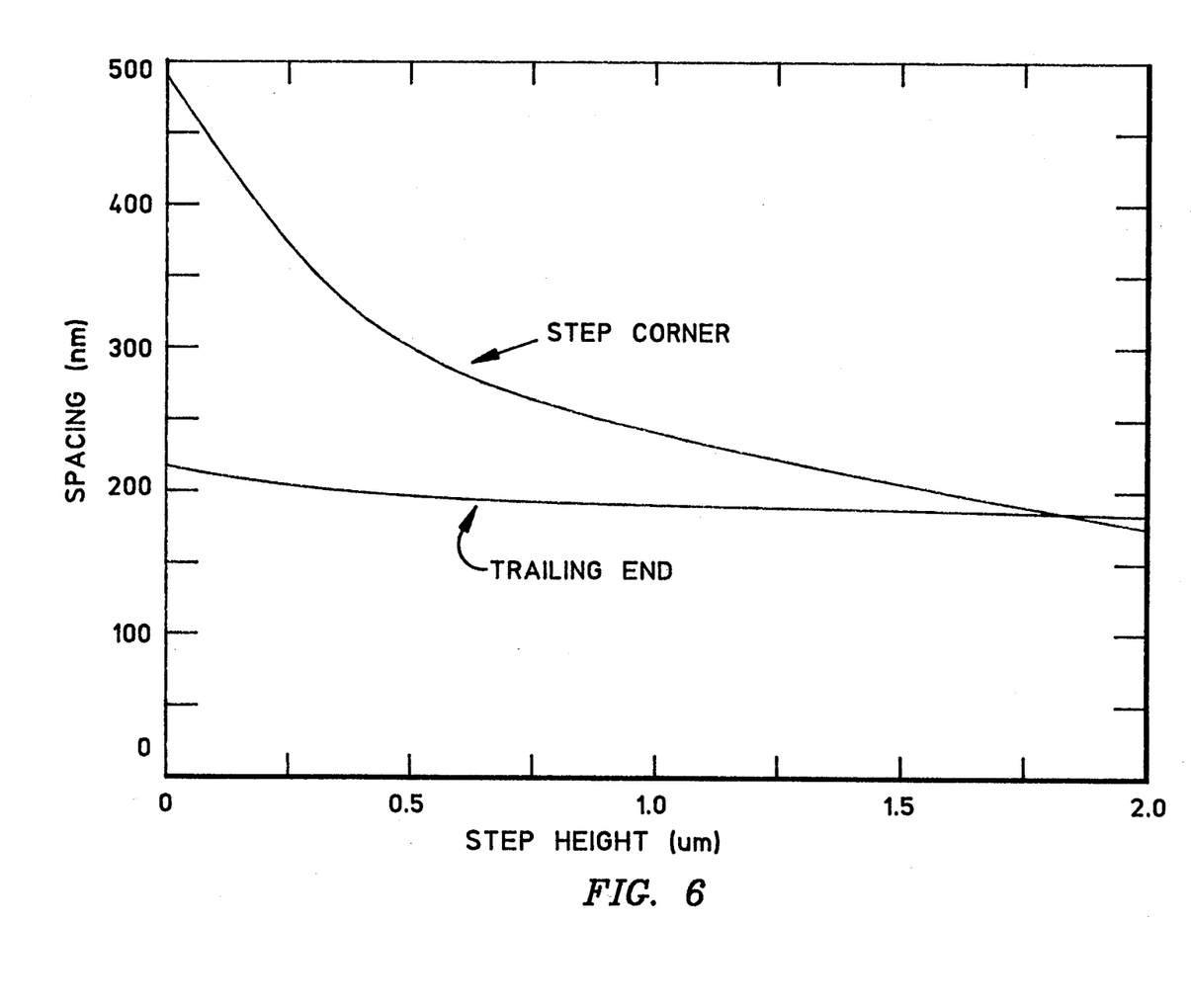
FIG. 6 is a graph illustrating the relationship between spacing and step projection height for the slider assembly illustrated in FIGS. 3 and 4.

FIG. 6 graphically illustrates the effect which step height h has on flying height measured at the trailing end corners of the step projections and the trailing edge of the modified assembly. The graph shows that step projection heights of up to 1.5 micrometers may be successful when used in conjunction with slider assemblies having physical characteristics described above with reference to FIG. 5. As a practical matter, the required step height will be dependent upon the slider geometry and load, the surface roughness of the data storage drive medium and upon the thickness of the lubrication layer on the surface of the disk. Taking these variables into account, effective step projection heights are typically in the range of 0.01 to 1.5 micrometers.

Figure 7A:
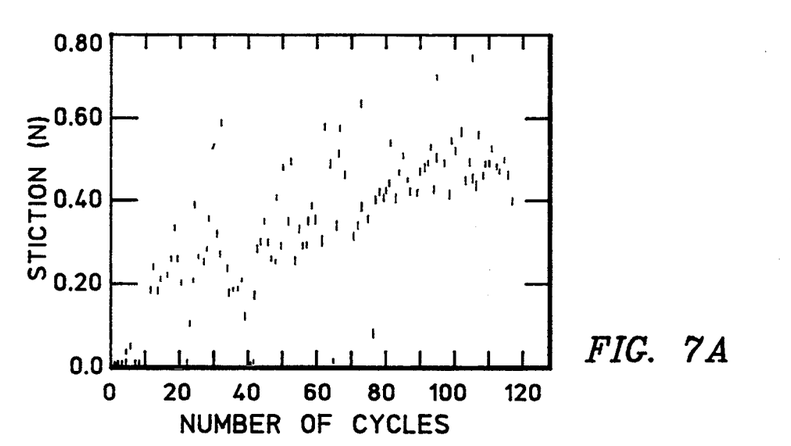
FIG. 7A is a graph showing the relationship between stiction and the number of start/stop cycles for a prior art slider structure on supersmooth disks.
Figure 7B:
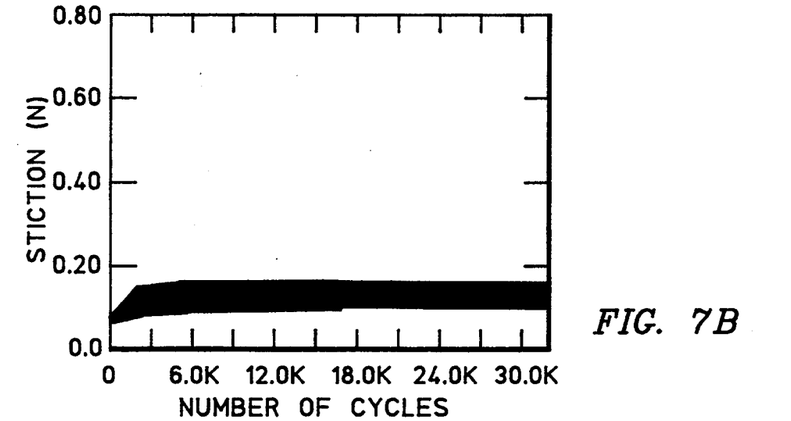
FIGS. 7B and 7C are graphs showing the relationship between stiction and the number of start/stop cycles for slider assemblies which incorporate the taper step projection of FIGS. 3 and 4.
Figure 7C:
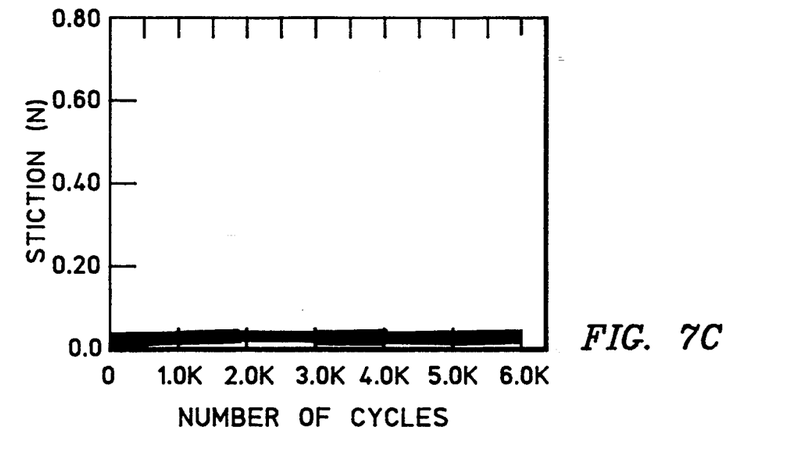

FIGS. 7A–7C are graphic representations of stiction versus number of start/stop operating cycles for various slider assembly configurations. Each graph was prepared using a slider in conjunction with an ultra-smooth (root-mean-square roughness less than 1 nanometer), carbon-coated magnetic disk with bonded and free surface lubricants having a total thickness of 2.3 nanometers. In FIG. 7A, for a reference dual-rail slider without step projections and with the load of 0.15 Newtons, stiction in excess of 0.80 Newtons was observed in less than 100 start/stop cycles at relative humidity(RH) of 30%. In FIG. 7B, a dual-rail slider assembly as described above with reference to FIGS. 3 and 4 having a step projection height h of 0.2 micrometers and a load of 0.15 Newtons was tested for 60,000 start/stop cycles at 30% RH without a single device failure and with the final stiction being measured at approximately 0.15 Newtons. FIG. 7C illustrates the measured stiction for a 3- rail slider similar to the design in FIG. 10 with a conventional taper, each rail of which carried a taper step projection having a height of 0.3 micrometers. The load was 0.06 Newtons and aggressive testing conditions with RH less than 10% were used. As FIG. 7C shows, after 6,000 cycles, the measured stiction was less than 0.04 Newtons.

Figure 8:
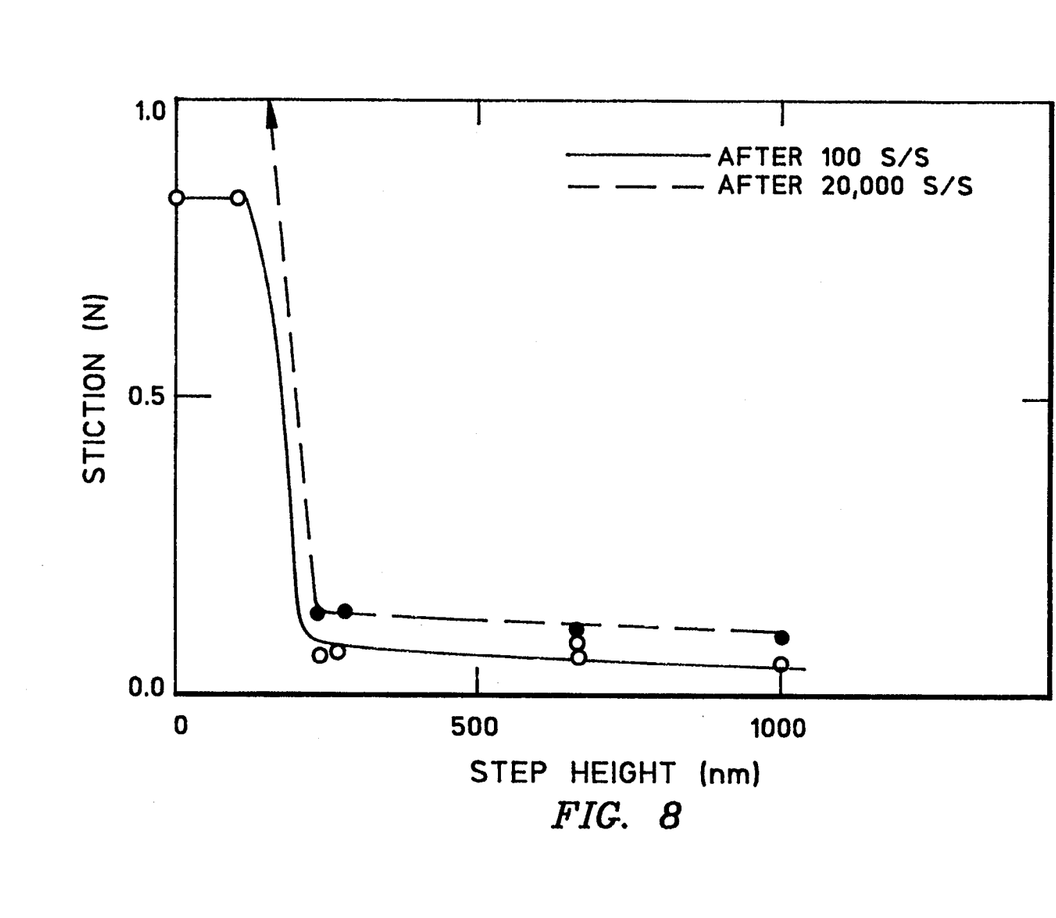
FIG. 8 is a graph showing the relationship between stiction and step projection height for the slider assembly of FIGS. 3 and 4.

FIG. 8 graphically illustrates the relationship between stiction and step projection height h. The relationship was measured twice: after 100 stop/start cycles, and after 20,000 stop/start cycles. The inference drawn from FIG. 8 is that the relationship between stiction and step projection height is dependent upon a number of factors, such as slider geometry, slider loading, slider material, slider crown and camber, the thickness of disk surface lubrication, the nature of any coating materials on the disk and slider, disk and slider surface roughness, slider/disk contact area, component hardness, and other factors. Because of the difficulty of quantifying and measuring all these factors, the required step height is determined empirically. However, it is evident that smaller slider assemblies and lighter loads will likely require smaller step heights than those shown in FIG. 8. The inventors contemplate that heights down to about 0.01 micrometers can be useful in these cases.

Figure 9A:
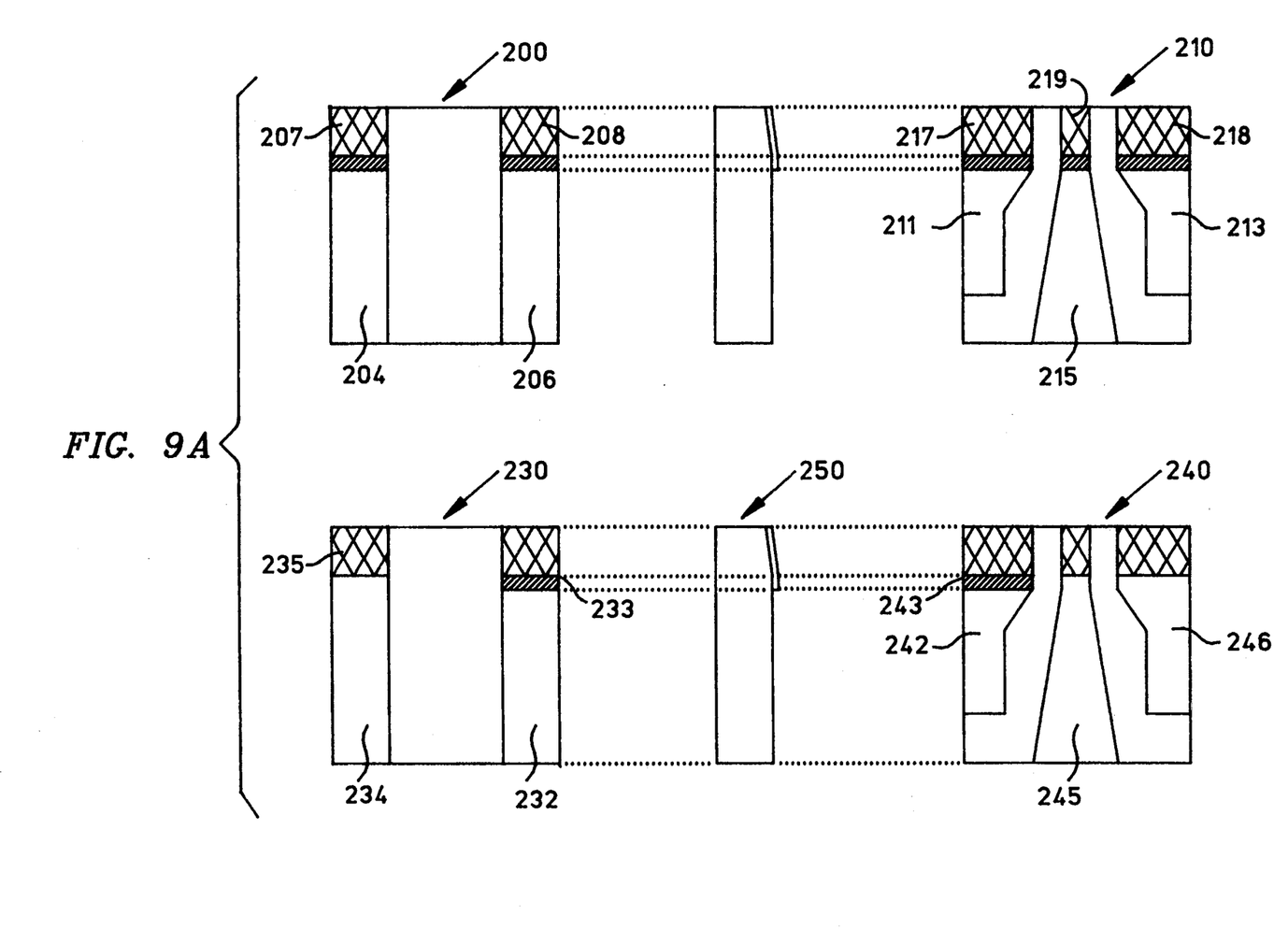
FIGS. 9A and 9B combine plan and side views of various slider assemblies with the taper step projection.
Figure 9B:
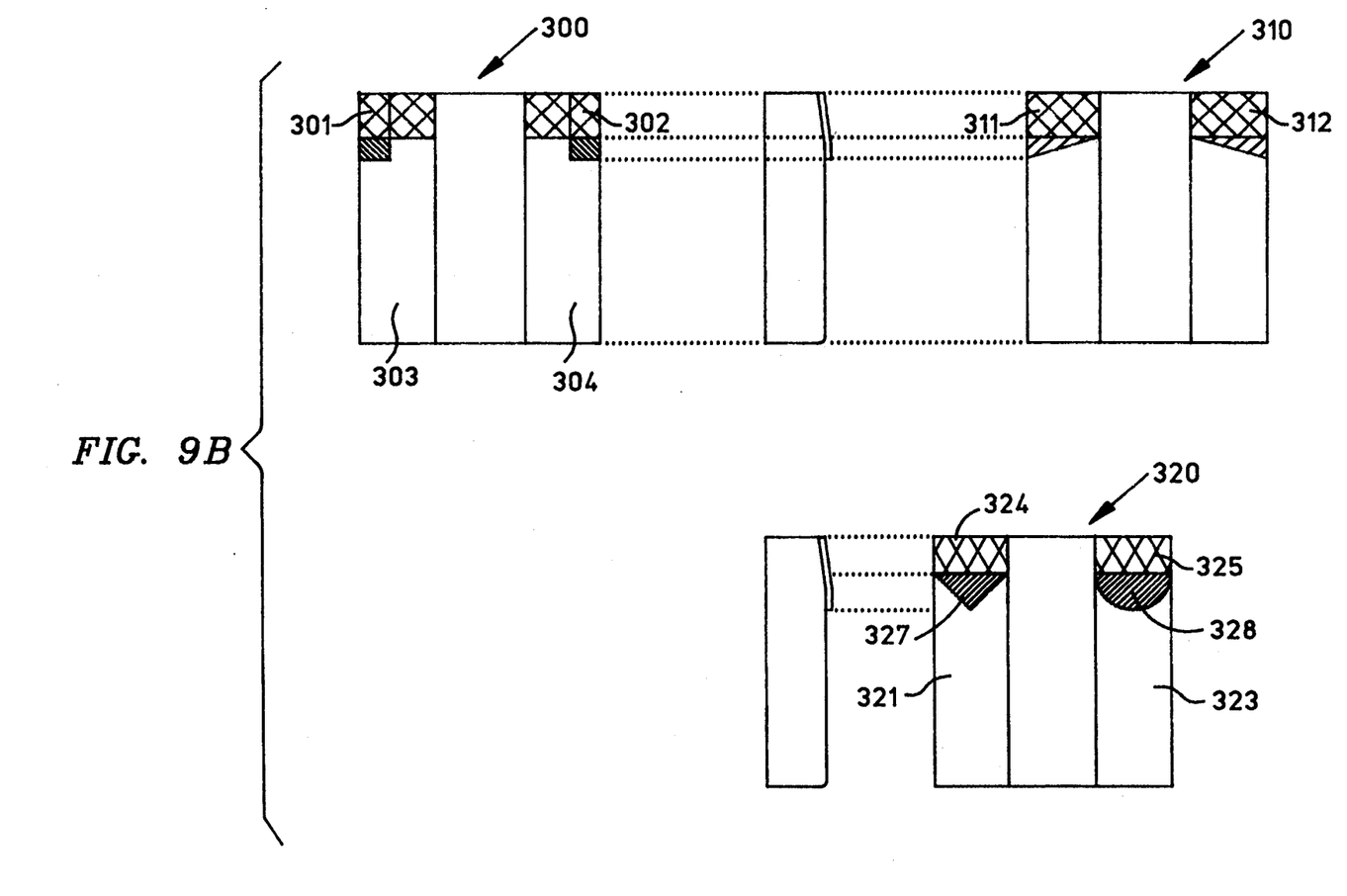

FIGS. 9A and 9B illustrate various alternate embodiments for the taper-step slider as generally presented in FIGS. 3 and 4. These slider configurations reflect optimization of slider geometry for a wide variety of possible system applications; all use taper step projections. In particular, the dual-rail slider assembly 200 uses two straight side rails 204 and 206 and two taper step projections 207 and 208, as discussed previously with regard to FIGS. 3 and 4. The slider assembly 210 employs a 3-rail configuration which can be understood with reference to U.S. Pat. No. 4,894,740. This slider employs two tapered side rails 211 and 213 and a tapered center rail 215. The side rails 211 and 213 include taper step projections 217 and 218, while the center rail 215 has a taper step projection 219. Viewed from the side, both of the slider assemblies 200 and 210 exhibit the elevational profile 220.

The slider assembly 230 is similar to slider assembly 200 except that only one rail 232 includes a taper step projection 233, while the other rail 234 includes a front taper 235 but no step projection. Slider assembly 240 is similar to slider assembly 210, except that only one rail 242 includes a taper step projection 243. The center rail 245 and the other side rail 246 both include conventional front tapers. The inventors contemplate that the slider assembly 240 can include a single step projection on any one of the three rails, or two step projections on any two of the rails. The side elevation profile 250 characterizes both slider assemblies 230 and 240, which produces both static pitch and roll of the slider to further minimize the contact area.

The slider assembly configurations illustrated in FIG. 9B reduce the contact area of the slider to a greater degree than the devices illustrated in FIG. 9A. For example, the slider assembly 300 reduces the contact area by decreasing the width of the step projections 301 and 302 relative to the width of side rails 303 and 304, respectively. The slider assembly 310 reduces the contact area by using non-rectangular step projections 311 and 312. The slider assembly 320 includes side rails 321 and 323, taper sections 324 and 325 and step projections 327 and 328. This slider assembly serves to illustrate the principle that step projections can be protuberances in the form of virtually any shape and can be combined with virtually any arbitrarily-shaped air bearing surface. It should be noted that the step edges resting on the disk surface need not be sharp, but can have a finite curvature to reduce any potential edge contact damage to the disk surface.

Figure 10:
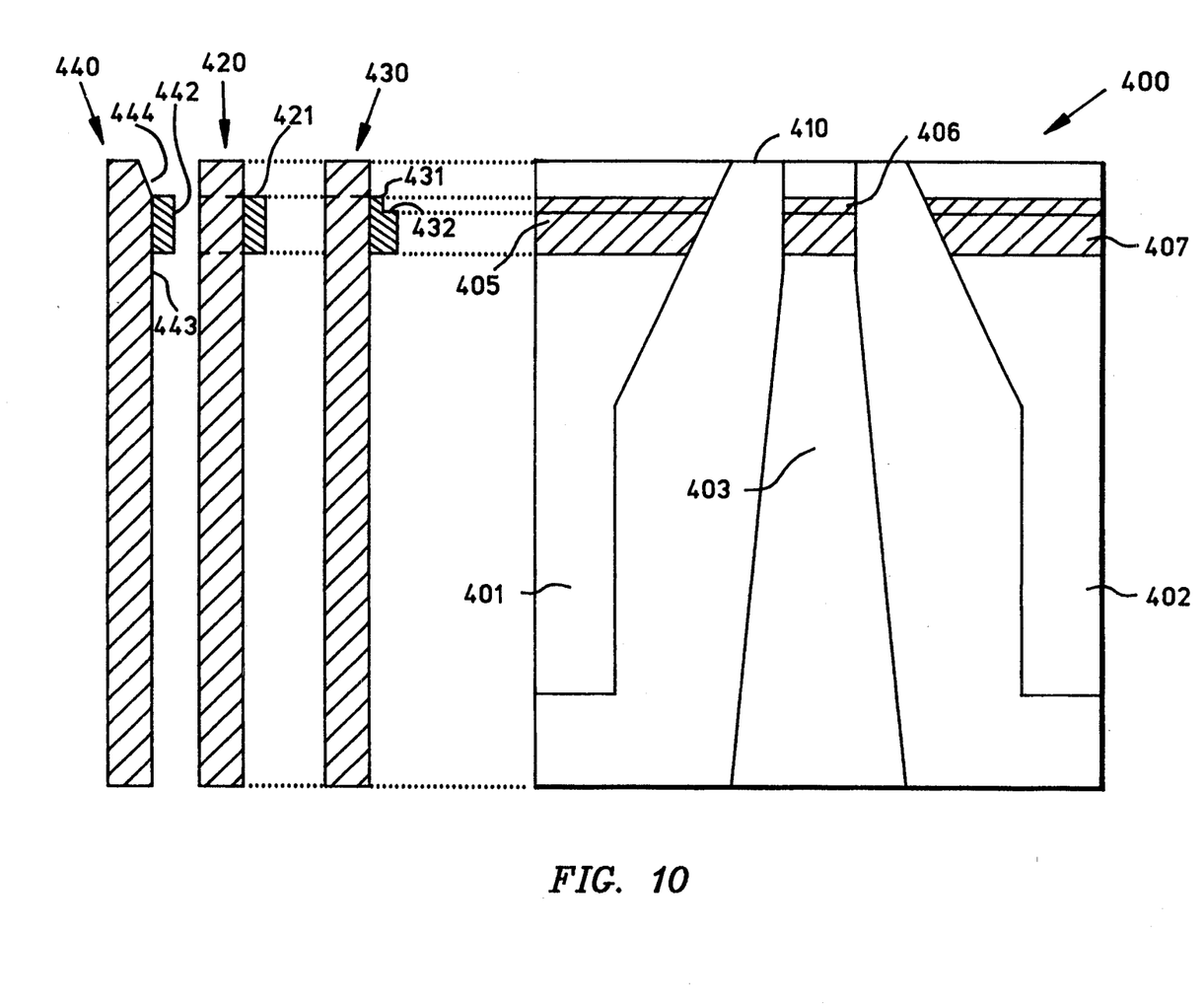
FIGS. 10 and 11 combine plan and side views of various slider configurations having a step projection with a stepped front face.

A further embodiment of the present invention provides an alternate step projection configuration which alleviates difficulties apparent in state-of-the-art slider fabrication methods. In particular, there is a practical difficulty in manufacturing a taper and undesirably high sample-to-sample variations occur due to manufacturing tolerances. These difficulties may be circumvented by deposition of a step projection with a specific height and length onto an ABS adjacent to, but set back from, a portion of the ABS which meets the leading edge of the slider assembly. The resulting structure may be termed a "leading edge step projection". A slider with a leading edge step projection presents an air bearing surface which is basically flat, except for raised features. The slider assembly will still rest at a static pitch angle with respect to a disk surface. FIG. 10 combines plan and side views of a tri-rail slider in accordance with this embodiment. Manifestly, this illustration and the following discussion are not intended to limit the leading edge step projection to tri-rail sliders, indeed, as with the taper step projection, it can be used with virtually any slider configuration.

The plan and side views of FIG. 10 illustrate a tri-rail slider 400 with two side rails 401 and 402 and a center rail 403. Leading edge step projections 405, 406, and 407 project outwardly from the rails 401,403 and 402, respectively. Each step projection is set back from the leading edge 410 of the slider assembly 400 on its respective rail. The step projections cause the slider assembly 400 to sit on a disk surface at a static pitch angle similar to a slider assembly with a taper step projection as discussed above.

As the side profile 420 illustrates, the leading edge step projection establishes a contour in the form of a single step 421 between the ABS and its leading face. Alternatively, as the slider assembly 430 illustrates, the leading step projection can include multiple steps 431 and 432 on its leading face.

A slider assembly with a single step leading edge step projection may not be as effective in achieving a high operating pitch angle as a slider with a regular taper angle. Typically, three or more superimposed steps would closely approximate a corresponding taper angle. Hence, multiple steps would give a higher pitch angle. Further, other design features of the slider assembly may be adjusted to achieve any desirable pitch angle. Indeed, in the prior art tri-rail slider, this was the purpose of widening the front portions of the side rails.

Figure 12:
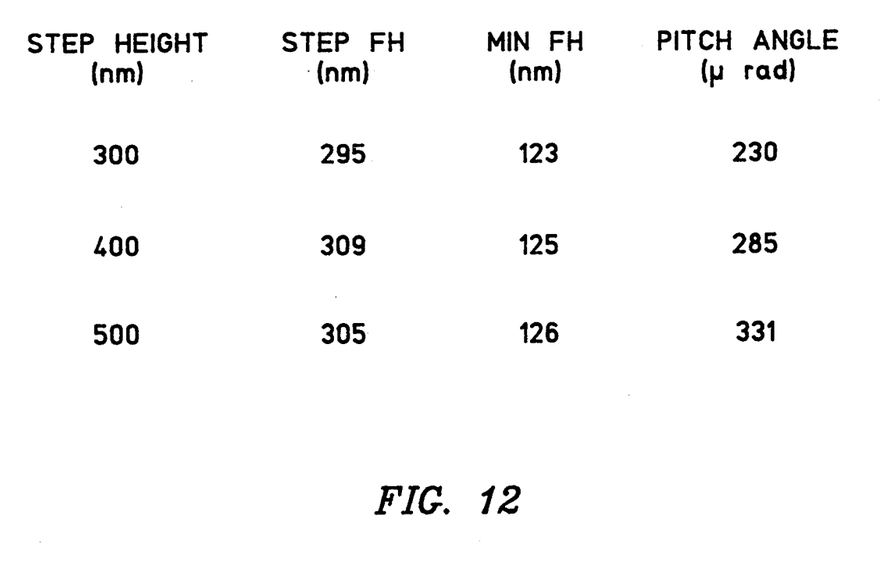
FIG. 12 is a table showing the flying height for the slider assembly illustrated in FIG. 10.

A tri-rail slider, such as the slider 400 in FIG. 10, with a slider length of 2.5 millimeters and a width of 1.6 millimeters was evaluated under DASD operation conditions. The slider included leading edge step projections on each of its three rails, with each step projection being set back from the leading edge by 150 micrometers and the length of the step being 300 micrometers. The three parameters; namely step height, step length and the set-back distance of the step from the slider leading edge need to be specified in defining a leading edge step projection. The slider assembly was designed with a suspension load of 0.06 Newtons and is operated against a disk rotated at 20 meters per second. FIG. 12 is a numerical chart showing step heights, step flying heights, the minimum flying height (MIN FH) measured at the trailing edge of the slider assembly, and the calculated pitch angle for tri-rail sliders including leading edge step projections. For the slider design with a 400 nanometer step height, both the minimum slider flying height and the step flying height are relatively insensitive to manufacturing variations in the step height. Lower step heights could also be used and in many applications may be sufficient to give adequate stiction reduction.

Referring once again to FIG. 10, the leading edge step projection sliders 420 and 430 rest on a disk surface at a static pitch angle while the disk is stationary. This prevents the front edges of the step projections from contacting the disk surface. For example, for a step height of 0.4 micrometers and a step length of 300 micrometers, the leading edge of the step projection rests at a distance of 0.085 micrometers from the disk surface. This prevents the leading edge of the step projection from damaging the disk during takeoff. A small amount of wear on the trailing edge of the step projection, while undesirable, is tolerable. In stationary conditions, slider assemblies 420 and 430 contact a disk surface only along three narrow sections at the trailing ends of their step projects and at the trailing ends of the slider assemblies.

The taper step projection structures in FIGS. 3–4 and FIG. 9 and the leading edge step projection slider assembly structures illustrated in FIG. 10 may be fabricated at the row carrier level by using photolithography and deposition of a hard, wear-resistant coating onto a slider surface. An example of such wear-resistant coating would be an amorphous carbon, carbon nitride, silicon nitride, silicon carbide and other refractory materials. Alternate fabrication techniques include lapping of slider body so that the final magnetic head throat height or magnetoresistive stripe heights are in the optimized range, film deposition through the mask and deposition of uniform film on the slider rows followed by photolithography and removal of the film from desired areas to form the step projections. In the case of leading edge step projection assembly the mechanical row level lapping needing to create the traditional raper angle is eliminated. A further advantage to the leading edge step projection structure is that the step length and height may be closely controlled using microfabrication techniques.

FIG. 10 also illustrates a slider assembly 440 which combines features of the taper-step and leading edge step projections discussed above. In the slider assembly 440, a step projection 442 is placed on a taper-flat air bearing surface 443 which includes a tapered transition 444 between the front end of the air bearing surface and the leading edge of the slider assembly. This configuration is realized in production by deposition of a stripe of material across the flat portion of the air bearing surface close to the trailing end of the taper region; it preserves the additional compressive effect of the taper, and provides a static pitch angle according to the invention.

Figure 11:
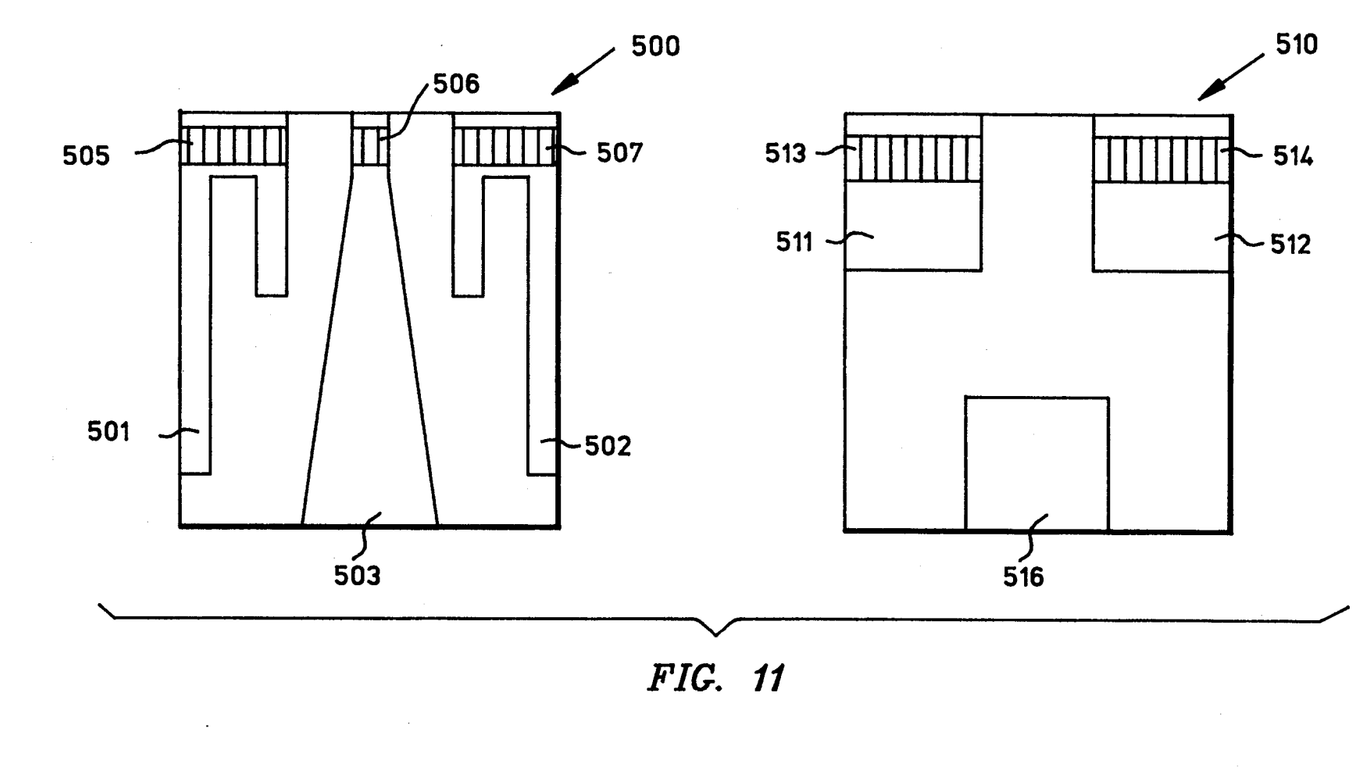

FIG. 11 illustrates the use of a leading edge step projection with a negative-pressure slider assembly. This combination is indicated by reference numeral 500. With reference to FIG. 11, the slider assembly 500 includes two tapered U-shaped side rails 501 and 502 and a tapered center rail 503. Leading edge step projections are formed on the rails and are indicated by, respectively, reference numerals 505,506, and 507. A tripod slider assembly 510 includes a pair of spaced-apart rectangularly-shaped air bearing surface pads 511 and 512 which join the leading and side edges of the slider assembly 510. Leading-edge step projections 513 and 514 are provided on the pads. A rear ABS rectangular pad 516 has an edge which adjoins the trailing edge of the slider assembly 510. A number of specific embodiments of the present invention are described. Nevertheless, it will be understood that various modifications and changes may be made without departing from the spirit and scope of the invention. Accordingly, it is to be understood that the invention is not to be limited by the specific illustrated embodiments, but only by the scope of the appended claims.

We claim:

1. A reduced-stiction slider assembly, comprising:
a slider body with a slider leading edge and a slider trailing edge;
a pivot pint on the slider boy;
a plurality of air bearing surfaces on the slider body, which extend between the slider leading edge and the slider trailing edge; and,
a projection on at least one of the air bearing surfaces, the projection extending outwardly from the at least one air bearing surface, the projection having a height h with respect to the at least one air bearing surface and being located on the at least one air bearing surface between the slider leading edge and the pivot point;
the projection including:
a front edge facing toward the slider leading edge and
a rear edge facing toward the slider trailing edge;
a step transition from the rear edge to the at least one
air bearing surface; and
a tapered transition tapering in height from the front edge to the slider leading edge.

2. A reduced-stiction slider assembly, comprising:
a slider body with at slider leading edge and a slider trailing edge;
a pivot point on the slider body;
a plurality of air bearing surfaces on the slider body, which extend between the slider leading edge and the slider trailing edge;
a tapered transition tapering in height from at least one of the air bearing surfaces to the leading edge of the slider; and
a projection extending outwardly from the at least one air bearing surface, the projection have a height h with respect to the air bearing surface and being located on the air bearing surface between the slider leading edge and the pivot point;
the projection including:
a front tapered transition portion overlaid on the tapered transition and extending to the slider leading edge;
a rear edge facing toward the slider trailing edge; and
a step transition from the rear edge to the at least one air bearing surface.

3. A reduced-stiction slider assembly, comprising:
a slider body with a slider leading edge and slider trailing edge;
a pivot point on the slider body;
a plurality of air bearing surfaces on the slider body, which extend between the slider leading edge and the slider trailing edge; and
a projection extending outwardly from at least one air bearing surface, the projection having a height h with respect to the at least one air bearing surface and being located on the at least one air bearing surface between the slider leading edge and the pivot point;
the projection including a front edge facing toward the slider leading edge and a rear edge facing toward the slider trailing edge;
a plurality of step transitions in the front edge; and
a step transition from the rear edge to the at least one air bearing surface.

4. A magnetic recording system, comprising:
a magnetic recording medium having a recording surface;
means for moving the magnetic recording medium;
a magnetic transducer and a slider supporting the transducer;
a pivot point on the slider;
means connected to the slider for supporting the slider adjacent to the recording surface in response to movement of the magnetic recording medium and for supporting the slider against the recording surface when the magnetic recording medium is at rest;
the slider including a slider leading edge and slider trailing edge;
at least one air bearing surface on the slider extending in a longitudinal direction between the slider trailing edge and the slider leading edge, the air bearing surface facing the recording surface; and
a projection means on the air bearing surface between the slider leading edge and a locus through the pivot point, the projection means for contacting the recording surface to maintain a static pitch angle between the air bearing surface and the recording surface when the magnetic recording medium is at rest;

the projection means including:
- a front edge facing toward the slider leading edge and
- a rear edge facing toward the slider trailing edge;
  - a tapered transition tapering in height from the front edge to the slider leading edge; and
  - a step transition from the rear edge to the at least one air bearing surface.

5. A magnetic recording system, comprising:
a magnetic recording medium having a recording surface;
means for moving the magnetic recording medium;
a magnetic transducer and a slider supporting the transducer;
a pivot point on the slider;
means connected to the slider for supporting the slider adjacent to the recording surface in response to the movement of the magnetic recording medium and for supporting the slider against the recording surface when the magnetic recording medium is at rest;
the slider including a slider leading edge and a slider trailing edge;
at least one bearing surface on the slider extending in a longitudinal direction between the slider leading edge and the trailing edge, the bearing surface facing the recording surface;
a tapered transition tapering in height from the bearing surface to the slider leading edge; and
projection means on the bearing surface between the slider leading edge and a locus through the pivot point for contacting the recording surface to maintain a static pitch angle between the bearing surface and the recording surface when the magnetic recording medium is at rest; the projection means including:
- a front tapered transition portion overlaid on the tapered transition and extending to the slider leading edge; and
- a rear edge and a step transition from the rear edge to the bearing surface.

6. A magnetic recording system, comprising:
a magnetic recording medium having a recording surface;
means for moving the magnetic recording medium;
a magnetic transducer and a slider supporting the transducer;
a pivot point on the slider;
means connected to the slider for supporting the slider adjacent to the recording surface in response to movement of the magnetic recording medium and for supporting the slider against the recording surface when the magnetic recording is at rest;
the slider including a slider leading edge and slider trailing edge;
at least one bearing surface on the slider extending in a longitudinal direction between the slider leading edge and the slider trailing edge, the bearing surface facing the recording surface; and
projection means on the bearing surface between the slider leading edge and a locus through the pivot point for contacting the recording surface to maintain a static pitch angle between the bearing surface and the recording surface when the magnetic recording medium is at rest;
the projection means including:
- a front edge facing the slider leading edge and including a plurality of step transitions; and
- a rear edge with a step transition to the bearing surface.

* * * * *

UNITED STATES PATENT AND TRADEMARK OFFICE
CERTIFICATE OF CORRECTION

PATENT NO. : 5,345,353
DATED : Sep. 6, 1994
INVENTOR(S) : Krantz et al.

It is certified that error appears in the above-indentified patent and that said Letters Patent is hereby corrected as shown below:

Column 9, line 54, please change "pint" to --point-- and

"boy" to --body--.

Column 10, line 7, please change "at" to --a--.

Signed and Sealed this

Fifteenth Day of November, 1994

Attest:

BRUCE LEHMAN

*Attesting Officer*     *Commissioner of Patents and Trademarks*